(12) United States Patent
Rodgers

(10) Patent No.: US 6,513,767 B1
(45) Date of Patent: Feb. 4, 2003

(54) ERGONOMIC ENCIRCLEMENT

(76) Inventor: J. Linn Rodgers, 7506 W. Ridge Rd., Elyria, OH (US) 44036

( * ) Notice: Subject to any disclaimer, the term of this patent is extended or adjusted under 35 U.S.C. 154(b) by 0 days.

(21) Appl. No.: 09/946,868

(22) Filed: Sep. 4, 2001

(51) Int. Cl.[7] .................................................. F16L 3/08
(52) U.S. Cl. ....................... 248/74.2; 248/74.3; 248/71; 248/73; 24/543; 24/16 PB
(58) Field of Search ........................... 248/71, 74.2, 50, 248/62, 73; 24/543, 16 PB, 30.5 T

(56) References Cited

U.S. PATENT DOCUMENTS

| | | | | |
|---|---|---|---|---|
| 2,625,758 A | * | 1/1953 | Shepherd | 24/543 |
| 3,358,484 A | * | 12/1967 | Page | 24/543 |
| 3,604,066 A | * | 9/1971 | Moon | 24/543 |
| 4,107,824 A | * | 8/1978 | Lussier | 24/543 |
| 4,243,193 A | * | 1/1981 | Jones | 248/62 |
| 4,371,137 A | * | 2/1983 | Anscher | 248/73 |
| 5,495,645 A | * | 3/1996 | Suzuki | 24/30.5 T |

* cited by examiner

*Primary Examiner*—Korie Chan
*Assistant Examiner*—Gwendolyn Baxter
(74) *Attorney, Agent, or Firm*—Donald D. Mon

(57) ABSTRACT

An encirclement to stabilize, and if desired also to anchor bundles of wires. It includes a base segment and a pair of integral arm segments having interior arcuate surfaces to encircle the bundle when the stiffly flexible arms are brought together. A latch tooth extends from each arm segment. The latch teeth extend across a central plane which all of the segments confront, to engage and latch the arm segments to one another and thereby encircle the bundle to hold it together.

8 Claims, 2 Drawing Sheets

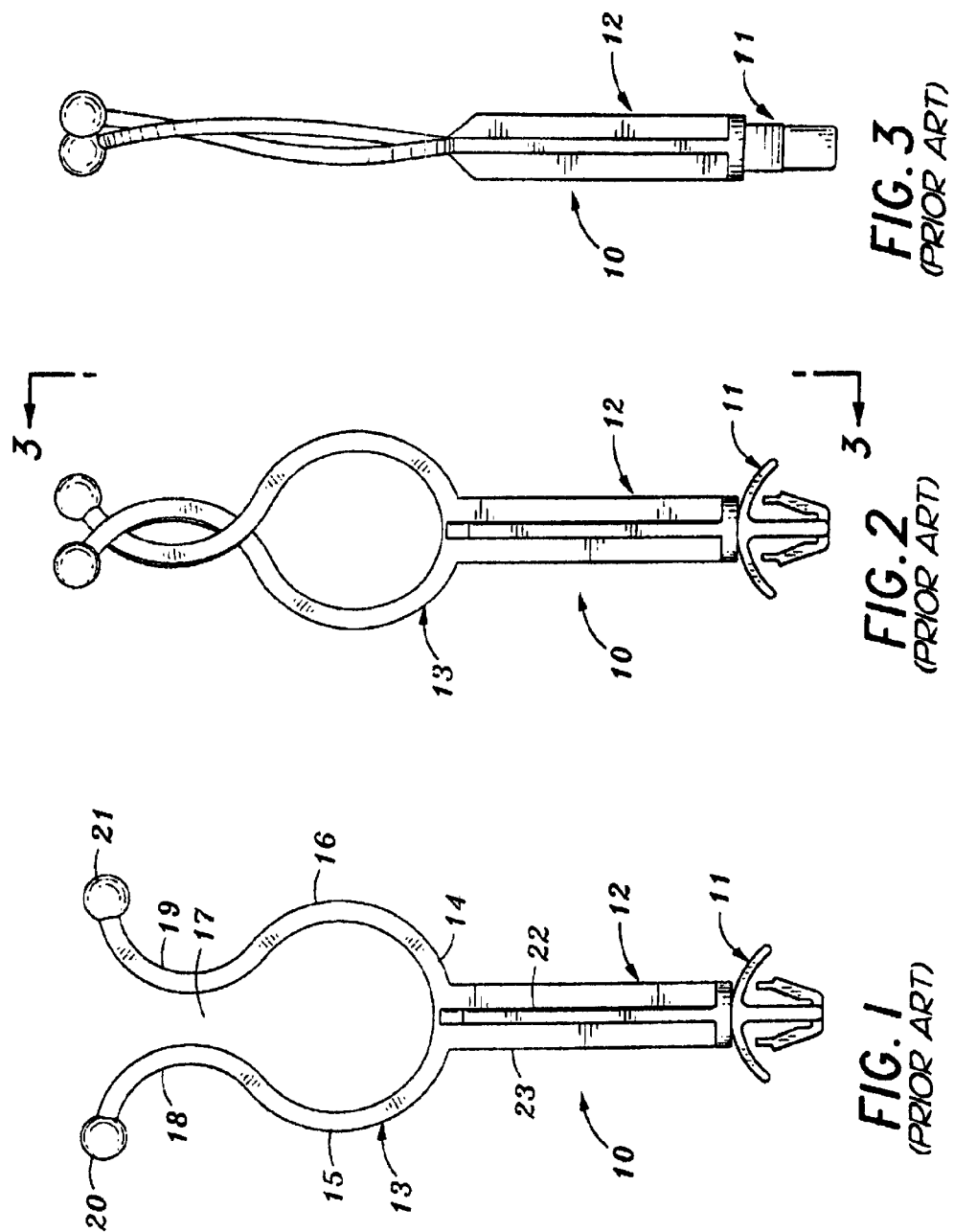

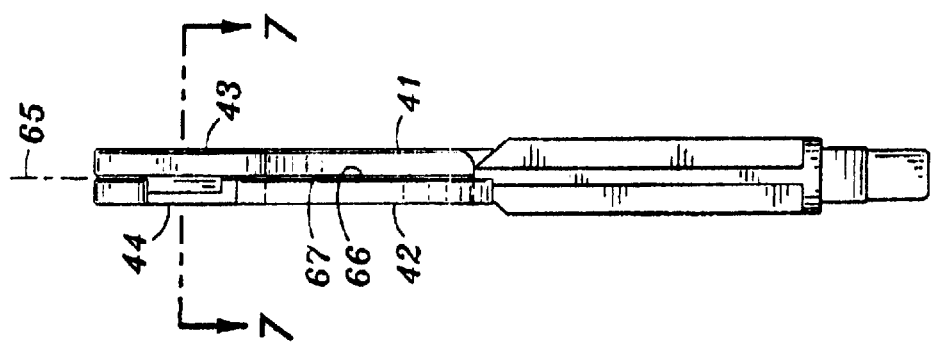
*FIG. 6*
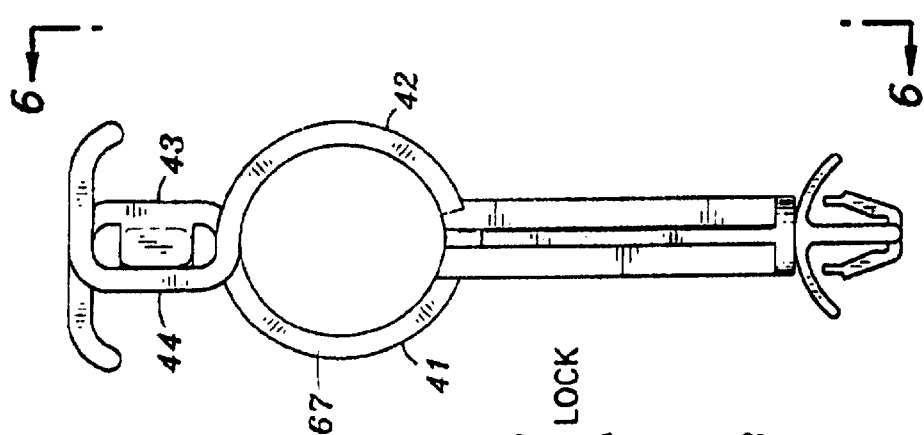
*FIG. 5*
*FIG. 7*
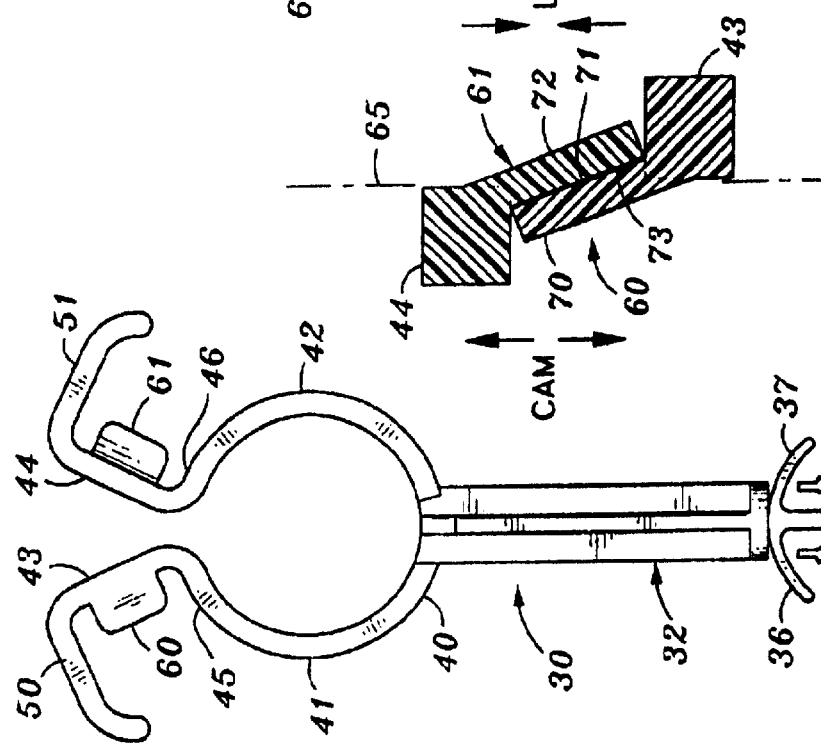
*FIG. 4*

ERGONOMIC ENCIRCLEMENT

FIELD OF THE INVENTION

A readily installed encirclement to stabilize, and if desired also to anchor bundles of wires.

BACKGROUND OF THE INVENTION

Mechanisms and apparatus which utilize electrical and electronic systems invariably contain groups of wires that must be held in a disciplined arrangement in bundles lest they tangle or catch on something. Such risks frequently exist during assembly, transportation and repair.

Also, in the absence of some orderliness, the attachment of many wires to as many terminals is vastly confused if there is a tangle of wires. Accordingly, it is common practice to bundle groups of wires to the extent that the apparatus allows.

When a group of wires is to be bundled (a process sometimes called "cabling"), the wires are laid out and then held as a group by some kind of encirclement. If such preliminary subassembly is not possible, the group will later be gathered and encircled.

Then, and this is especially the situation in vehicles, it often is desirable to anchor the assembled bundle so as to stabilize it against moving around or sagging.

Encirclement devices and anchors are well-known in the prior art. Anything that will gather and hold a group of wires together, or hold them to a structure will suffice for the purpose. Even a piece of cord can do the job. Because of this simple objective, solutions to encirclement and anchoring requirements are numerous, and is a matter of some surprise that improvements are still possible at this day.

One reason is because assembly-line time has become a serious economic burden, and needs to be reduced as much as possible. A device which is even slightly quicker to install and adds little if anything to the cost is much desired.

In addition, repetitive motion injuries have become a serious concern. A device which requires finger manipulation and careful alignment can lead to anatomical damage of the installer, as well as to a lesser quality of the work that he does.

It is an object of this invention to provide an encirclement (sometimes herein called a "clip") that needs only to be pressed over a group of wires, and its two arms pressed against one another. No more than a shove and a pinch. For anchoring, which is optional, a self-retentive spear can be stabbed into a structural opening. That is all.

It is another object of the invention to provide an encirclement that can be molded from organic plastic resin, at rapid production rates and at minimal cost.

BRIEF DESCRIPTION OF THE INVENTION

An encirclement according to this invention is a ring-like structure made of stiffly flexible shape-retention material. It is preferably molded from a thermoplastic organic resin. It includes a base segment and a pair of opposed arm segments. Each arm segment carries a latch segment with an angular latch tooth which engage each other when crossed past one another and released.

The arm segments and latch segments each have a bearing face that lies in a common central plane so that when the latch teeth are engaged, the bearing faces bear against each other.

Preferably in the relaxed condition, the latch segments are spaced from one another and are angularly related to form a channel through which a bundle of wires can readily be passed when the encirclement is around it.

The above and other features of this invention will be fully understood from the following detailed description and the accompanying drawings, in which:

BRIEF DESCRIPTION OF THE DRAWINGS

FIG. 1 illustrates a known prior art device before installation;

FIG. 2 is a plan view as in FIG. 1, with the device installed;

FIG. 3 is a right hand side view taken at line 3—3 in FIG. 2;

FIG. 4 is a plan view of the presently-preferred embodiment of this invention before installation;

FIG. 5 is a plan view of the device of FIG. 4 after installation;

FIG. 6 is a right hand side view taken at line 6—6 in FIG. 4, the left hand view being identical to it; and FIG. 7 is a cross-section taken at line 7—7 in FIG. 6.

DETAILED DESCRIPTION OF THE INVENTION

FIG. 1 shows a known prior art encirclement 10. It illustrates some of the disadvantages of the prior art. Encirclement 10 includes an optional spear 11 which can be stabbed into an opening (not shown) in structure. It includes a shank 12 that is continuous with a ring-like structure 13.

Structure 13 includes a base segment 14, and two arm segments 15, 16. They are continuous and in their relaxed condition the arm segments leave an open channel 17 between them. Latch segments 18, 19 curve outwardly, and terminate in enlargements 20, 21, preferably ball-shaped. Reinforcing ribs 22, 23 strengthen the shank.

The method of installing this encirclement is to press the latch segments against the bundle. The latch segments will move apart while it passes through the channel, and then will close again.

This will not lock the cable in the encirclement. To accomplish this, the installer must reach around the bundle and then twist the latch segments as shown. These tend to spring back, but the enlargements prevent it. Thus, the installation requires the installer to reach around and find the ends, then grab them, probably with both hands, and twist the latch segments. This is a complicated manual movement and involves the risk of repetitive motion injury when done many times an hour. Also it will be noted that this complicated movement takes time, and time on an assembly line is very expensive. This illustrates many of the disadvantages of the prior art. In addition, should forces arise which tend to spread the latch segments, the rounded enlargements at least theoretically could cam past one another and allow the encirclement to release.

The preferred encirclement 30 according to this invention is a ring-like structure made of a stiffly flexible shape retentive material, preferably made from a thermoplastic organic resin such as NYLEX or any other suitable thermoplastic resin of the NYLEX family.

It can include an optional spear 31 with a shank 32 useful for a handle. On its free end there is a lock 33 which is comprised of a pair of barbs 34, 35 and two flexible spring leaves 36, 37. The barbs are spaced from the spring leaves by a spacer 38.

The barbs and leaves are springy. After the barbs are pressed into a body or passed through an opening (neither being shown) they will spring out. The shank will be pressed axially so the leaves bear against the body, flattening as they do so. Their spring back force that is exerted through the spacer will cause the barbs to tend to move apart and engage the body so as to anchor the encirclement to it.

The handle and the lock are optional. Both can be omitted, or the shank can be included as a handle but without a lock, as preferred.

The structure includes a central base segment 40 extending on each side of a central axis. The structure is symmetrical when viewed in the plane of FIG. 4. It is not symmetrical as viewed in FIG. 6, for a reason to be disclosed.

Arm segments 41, 42 extend from opposite ends of the base segment, and are arcuate. Latch segments 43, 44 extend from respective free ends 45, 46 of arm segments 41. 42.

Flange segments 50, 51 extend from the free ends of the latch segments, in opposite directions from one another. Thus, the internal curvatures of the arm segments are opposite from the curvature between the flange segments and the arm segments.

Latch teeth 60, 61 extend from respective latch segments 43, 44. As shown in FIG. 4, these are plate-like teeth which are not designed to be flexible. They are for retentive locking purposes.

The invention will best be understood by examining FIGS. 6 and 7, which show a central plane 65, which is also the plane of FIGS. 4 and 5. All of the segments have a bearing face which lies in the plane. Thus, for example, bearing face 66 on arm segment 42 lies on plane 65 and bearing face 67 on arm segment 41 also lies in the plane. The situation is identical for the latch segments and flange segments. When the arm segments are brought together, portions of them bear against one another. Thus, as shown in FIG. 6, arm segment 42 faces to the right and arm segment 41 faces to the left. They are offset relative to one another, opposite in plan view, and adjacent in side view (FIG. 6). Some parts of bearing surfaces 66 and 67 bear against one another when the device is closed.

Now, bearing in mind that at least the arm segments are stiffly flexible, notice that the latch teeth cross over the central plane, each in the opposite direction from the other. As best shown in FIG. 7, latch tooth 60 on latch arm 43 has a cam surface 70 and a latch surface 71. Latch tooth 61 on a latch arm 44 has a cam surface 72 and a latch surface 73.

Both of these teeth cross the central plane 65 and interfere with one another when the arm segments are brought toward one another and pass one another. At this event, the arm segments yield enough that the cam surfaces can pass over one another, after which the arm segments return to their original shape.

After that, assuming that the tips of the teeth have passed one another, the spring back of the structure brings the latch surfaces 71 and 73 together in opposition, and the structure is locked closed as shown in FIGS. 5, 6 and 7. To simplify the drawings, bundles have not been shown in FIGS. 3 and 6. They could nearly fill it.

The encirclement can be re-opened only by reducing the cross-section enclosed by the base segment and arm segments. This is an unlikely event unless strenuous efforts are made to release the latch keys from one another.

Installation is simple. The latch arms must be spread, which is simple when they are slanted relative to one another, and even easier when there is a gap between them as shown. Then the encirclement merely need be pressed over the bundle.

This encirclement can readily and inexpensively be produced. For installation, all the installer must do is axially press the device over the bundle, and then press the flange segments toward one another until the teeth past one another, and release it. There is no twisting movement such as needed to make a tie or twist. It is very quick.

It can advantageously be molded in a simple piece from any suitable organic plastic resin or mixture of resins.

This invention is not to be limited by the embodiment shown in the drawings and described in the description, which is given by way of example and not of limitation, but only in accordance with the scope of the appended claims.

What is claimed is:

1. An encirclement comprising a body, said encirclement having a theoretical central plane, said body comprising:

first and second arm segments extending from a base segment, each segment having an interior arcuate surface, said arcuate surfaces facing one another;

a first latch segment and a second latch segment, integral with and respectively extending away from said first and second arm segments, and spaced from said base segment;

a first flange segment and a second flange segment spaced from respective said first and second arm segments, integral with and extending away from said first and second latch segments;

said arm segments and said latch segments each having a bearing surface lying on said central plane, said bearing surface on said first segment facing the bearing surface on said second segment of each said arm segment and said latch segment;

a latch tooth on each latch segment, extending across said central plane, each said tooth having a cam surface so disposed and arranged as to contact and slide over the other cam surface when the arm segments are brought toward one another, and a latch surface so disposed and arranged as to interfere with the other latch surface if the arm segments are attempted to be moved apart after the latch teeth have cammed past one another, at least said arm segments being stiffly flexible and shape-retentive, to enable them to spread apart to admit and then to close upon a bundle, and to permit said latch teeth to engage one another at that time;

each of said flange segments overhanging and extending beyond its respective latch tooth;

said arm segments and said latch segments, except for said latch teeth, lying entirely on a respective side of said central plane.

2. An encirclement according to claim 1 in which the body is unitary and molded in a single piece from an organic thermoplastic resin.

3. An encirclement according to claim 2 in which said resin is of the NYLEX family.

4. An encirclement according to claim 1 in which a shank extends from said base segment in said plane.

5. An encirclement according to claim 4 in which a lock is provided on said shank spaced from said base segment, said lock comprising a pair of oppositely facing barbs and a pair of overhanging spring leaves deflectable when said barbs are inserted into material to provide a spring back force tending to hold the barbs in the material.

6. An encirclement according to claim 5 in which a lock is integrally molded with the shank.

7. An encirclement according to claim 6 in which the body is unitary and molded in a single piece from an organic thermoplastic resin.

8. An encirclement according to claim 7 in which said resin is of the NYLEX family.

* * * * *